United States Patent
Taub et al.

(10) Patent No.: US 10,516,532 B2
(45) Date of Patent: Dec. 24, 2019

(54) SESSION KEY REPOSITORY

(71) Applicant: ENTIT SOFTWARE LLC, Sanford, NC (US)

(72) Inventors: David Taub, Yehud (IL); Michael Gopshtein, Modiin (IL); Sergey Pastukhov, Odessa (UA); Rotem Steuer, Modiin (IL); Shir Yerushalmi, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 7 days.

(21) Appl. No.: 15/543,328

(22) PCT Filed: Jan. 22, 2015

(86) PCT No.: PCT/US2015/012356
§ 371 (c)(1),
(2) Date: Jul. 13, 2017

(87) PCT Pub. No.: WO2016/118131
PCT Pub. Date: Jul. 28, 2016

(65) Prior Publication Data
US 2018/0006816 A1    Jan. 4, 2018

(51) Int. Cl.
*H04L 29/06* (2006.01)
*H04L 9/08* (2006.01)

(52) U.S. Cl.
CPC .......... *H04L 9/0894* (2013.01); *H04L 9/0841* (2013.01); *H04L 63/0442* (2013.01);
(Continued)

(58) Field of Classification Search
CPC . H04L 9/0894; H04L 9/0841; H04L 63/0442; H04L 63/06; H04L 63/061; H04L 63/20; H04L 2463/041
See application file for complete search history.

(56) References Cited

U.S. PATENT DOCUMENTS 5,631,961 A * 5/1997 Mills .................... H04L 9/0866
380/28
5,689,730 A * 11/1997 Wakasugi ................. G06F 3/12
710/1
(Continued)

FOREIGN PATENT DOCUMENTS

WO    WO-2014017959    1/2014

OTHER PUBLICATIONS

Citrix, "Flow to Export and Use SSL Session Keys to Decrypt SSL Traces Without Sharing the SSL Private Key"; Mar. 26, 2014; 8 pgs., <http://support.citrix.com/article/CTX135889>.
(Continued)

*Primary Examiner* — Ghodrat Jamshidi

(57) ABSTRACT

In one implementation, a system for a session key repository includes a monitor engine to monitor communication between a first computing device and a second computing device that is encrypted with a private key, an identification engine to determine a number of session keys and session IDs that correspond to the encrypted communication, a rules engine to determine a number of rules for storing and sharing the number of corresponding session keys and session IDs, a repository engine to send a portion of the number of session keys and session IDs to a network tool based on the number of rules and identification of the network tool.

18 Claims, 5 Drawing Sheets

(52) U.S. Cl.
CPC ............ *H04L 63/06* (2013.01); *H04L 63/061* (2013.01); *H04L 63/20* (2013.01); *H04L 2463/041* (2013.01)

(56) References Cited

U.S. PATENT DOCUMENTS

| | | | |
|---|---|---|---|
| 6,539,479 B1 | 3/2003 | Wu | |
| 6,745,243 B2* | 6/2004 | Squire | H04L 29/12009 709/227 |
| 7,590,844 B1 | 9/2009 | Sherman et al. | |
| 8,254,882 B2* | 8/2012 | Cam-Winget | H04W 12/08 455/410 |
| 8,583,914 B2 | 11/2013 | Lev Ran et al. | |
| 8,683,209 B2* | 3/2014 | Li | H04L 9/321 713/168 |
| 8,904,181 B1 | 12/2014 | Felsher et al. | |
| 2004/0002384 A1* | 1/2004 | Multerer | A63F 13/12 463/42 |
| 2004/0205330 A1* | 10/2004 | Godfrey | G06Q 10/107 713/150 |
| 2006/0059094 A1* | 3/2006 | Oh | G06F 21/10 705/51 |
| 2009/0106551 A1* | 4/2009 | Boren | H04L 9/0822 713/158 |
| 2009/0235338 A1* | 9/2009 | Sheehan | H04L 9/0891 726/5 |
| 2010/0050241 A1* | 2/2010 | Yan | G06F 21/10 726/5 |
| 2011/0302289 A1* | 12/2011 | Shaikh | H04L 29/12216 709/223 |
| 2013/0080777 A1* | 3/2013 | Martell | H04L 9/14 713/168 |
| 2013/0086250 A1* | 4/2013 | Eskicioglu | H04L 12/6418 709/224 |
| 2013/0156189 A1 | 6/2013 | Gero et al. | |
| 2013/0191631 A1 | 7/2013 | Ylonen et al. | |
| 2014/0068267 A1* | 3/2014 | Le Saint | H04L 63/0421 713/171 |
| 2014/0157358 A1 | 6/2014 | Agarwal et al. | |
| 2014/0280737 A1* | 9/2014 | Bicket | H04L 67/02 709/218 |
| 2015/0195261 A1* | 7/2015 | Gehrmann | H04L 9/0833 726/7 |
| 2016/0044007 A1* | 2/2016 | Boudguiga | H04L 9/083 713/171 |

OTHER PUBLICATIONS

International Searching Authority, International Search Report and Written Opnion, dated Oct. 22, 2015, 13 pgs.

Liu, C. et al., "CCBKE—Session Key Negotiation for Fast and Secure Scheduling of Scientific Applications in Cloud Computing," Jul. 12, 2012, 16 pages, University of Western Australia, Australia, <https://eprint.iacr.org/2012/385.pdf>.

http://support.citrix.com/article/CTX135889 "How to Export and Use SSL Session Keys to Decrypt SSL Traces Without Sharing the SSL Private Key".

International Searching Authority, International Search Report and Written Opinion, dated Oct. 22, 2015, 13 pgs.

Liu, C. et al., CCBKE —Session Key Negotiation for Fast and Secure Scheduling of n Scientific Applications in Cloud Computing, Jul. 12, 2012, 16 pages https://eprint.iacr.org/.

"Real User Monitoring (RUM), End User Application Monitoring Software Tool", Sep. 16, 2014, 5 pages. <https://web.archive.org/web/20140916235655/http://www8.hp.com/il/en/software-soiutions/end-user-monitoring/index.html>.

Anonymous, "HP RUM Server Collector", Sep. 2015, 4 pages.

WikipediA, "Diffie-Hellman key exchange", retrieved from the Internet on Jan. 2, 2019, 5 pages. <http://en.wikipedia.org/wiki/Diffie%E2%80%93Hellman_key_exchange>.

WikipediA, "Perfect Forward Secrecy", retrieved from the Internet on Jan. 2, 2019, 5 pages. <http://en.wikipedia.org/wiki/Forward_secrecy#Perfect_forward_secrecy>.

WikipediA, "Transport Layer Security", retrieved from the Internet on Jan. 2, 2019, 33 pages. <http://en.wikipedia.org/wiki/Transport_Layer_Security>.

* cited by examiner

US 10,516,532 B2

SESSION KEY REPOSITORY

BACKGROUND

A number of network tools can be utilized to process network traffic and/or communication for an application. The number of network tools can utilize a number of private keys to decrypt the content of the network traffic and/or communication for the application. The number of network tools can receive the number of private keys from an administrator of the application. The administrator may not want to give the number of network tools the number of private keys due to security concerns of the administrator.

DETAILED DESCRIPTION

Figure 1:
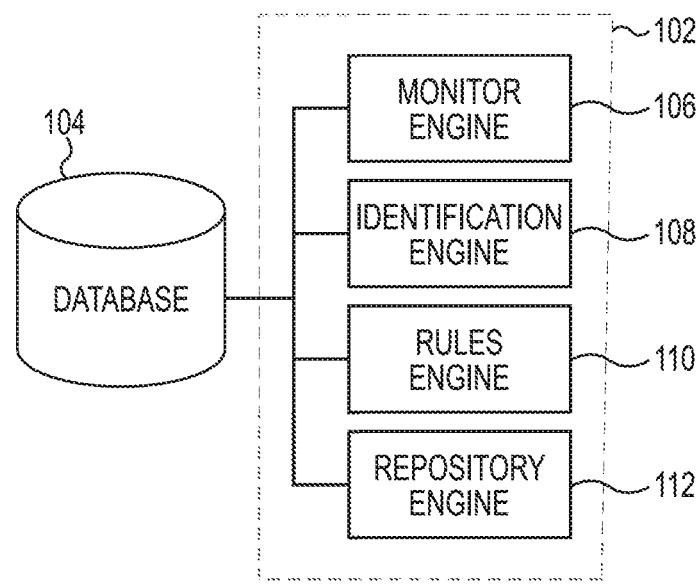
FIG. 1 illustrates a diagram of an example of a system for a session key repository consistent with the present disclosure.

A number of methods, systems, and computer readable medium for a session key repository are described herein. The session key repository can be implemented for an application (e.g., system as a service (SaaS), computer application, executed instructions to perform a function, etc.). The application can communicate (e.g., network communication, send packets, etc.) with a number of other applications and/or computing devices via a network. The application can utilize encryption (e.g., secure socket layer (SSL) encryption, transport layer security (TLS) encryption, Diffie-Hellman (DH), etc.) to secure communication with the number of other applications and/or computing devices.

A number of network tools can be utilized with the application to monitor and/or help performance of the application. In some embodiments, the number of network tools can include monitoring tools (e.g., real user monitor (RUM)), intrusion detection tools, and/or prevention system tools. The number of network tools can utilize a number of techniques (e.g., sniffer-based technique, packet analyzer, network analyzer, protocol analyzer, etc.) to monitor communication traffic from the application to the number of other applications and/or computing devices. For example, the number of techniques can include intercepting and logging communication traffic passing over a network or a portion of the network. In previous embodiments, the number of network tools may require a private key and/or private key/public key combination in order to decrypt the communication traffic.

It can be a security risk to issue a private key and/or private key/public key combination to the number of network tools. It can be advantageous for the number of network tools to be able to decrypt/encrypt the communication traffic without having access to the private key/public key combination. For example, it can increase security of the application since the application can limit the number of tools that require a private key and/or private key/public key combination. The session key repository described herein can enable the number of network tools to decrypt encrypted communication of the application without having access to the private key and/or private key/public key combination of the application.

The session key repository can be utilized to store a session key (e.g., key associated with a particular communication session), session identification (ID) (e.g., ID established with a particular communication session), and/or corresponding communication packets in a database (e.g., session key repository, session key database, database, etc.). In some embodiments, the database can be utilized to decrypt communication packets utilizing the corresponding stored session key. In addition, the database can be utilized to issue the encrypted communication packets and corresponding session key and/or session ID to the number of network tools. By storing the session keys and/or session IDs for corresponding communication packets in a database, the communication packets can be decrypted at a later time utilizing the corresponding session keys and/or session IDs without requiring the private key of the application.

Figure 2:
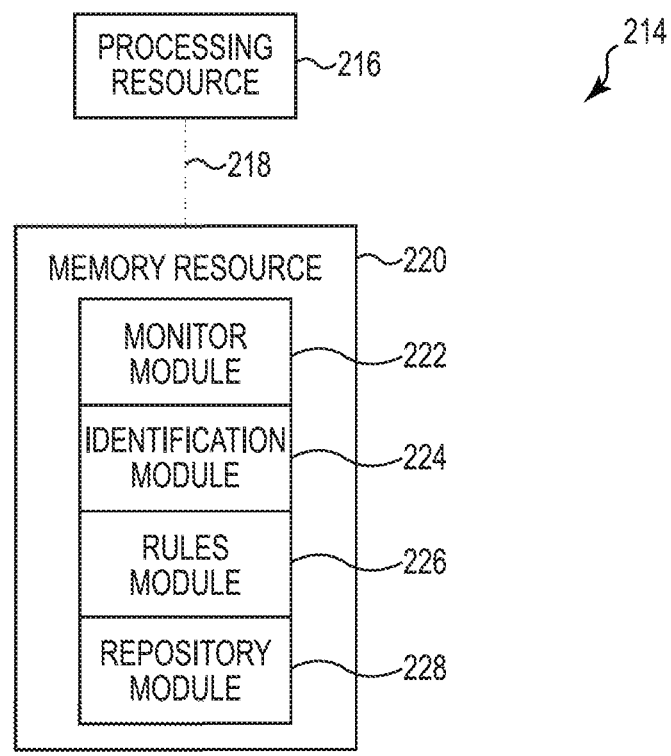
FIG. 2 illustrates a diagram of an example computing device consistent with the present disclosure.

FIGS. 1 and 2 illustrate examples of system 100 and computing device 214 consistent with the present disclosure. FIG. 1 illustrates a diagram of an example of a system 100 for a session key repository consistent with the present disclosure. The system 100 can include a database 104, a session key repository system 102, and/or a number of engines (e.g., monitor engine 106, identification engine 108, rules engine 110, repository engine 112). The session key repository system 102 can be in communication with the database 104 via a communication link, and can include the number of engines (e.g., monitor engine 106, identification engine 108, rules engine 110, repository engine 112). The session key repository system 102 can include additional or fewer engines that are illustrated to perform the various functions as will be described in further detail in connection with FIGS. 3-6.

The number of engines (e.g., monitor engine 106, identification engine 108, rules engine 110, repository engine 112) can include a combination of hardware and programming, but at least hardware, that is configured to perform functions described herein (e.g., monitor encrypted communication between a first computing device and a second computing device, determine a session key and a session ID that corresponds to the encrypted communication, determine a number of rules, store portions of the encrypted communication with the corresponding session key and session ID based on the number of rules, etc.). The programming can include program instructions (e.g., software, firmware, etc.) stored in a memory resource (e.g., computer readable medium, machine readable medium, etc.) as well as hard-wired program (e.g., logic).

The monitor engine 106 can include hardware and/or a combination of hardware and programming, but at least hardware, to monitor communication between a first computing device and a second computing device that is encrypted with a private key. Monitoring communication between the first computing device and the second computing device can include monitoring application communication on the first computing device with an application on the second computing device. The application communication can include sending communication packets from the first computing device to the second computing device. The application communication can be encrypted to ensure that only authorized applications and/or network tools can decrypt the encrypted application communication.

The identification engine 108 can include hardware and/or a combination of hardware and programming, but at least hardware, to determine a number of session keys and session IDs that correspond to the encrypted communication. The identification engine 108 can determine the session key and the session ID from a database where all session keys and session IDs are stored for a particular application. In some embodiments, the identification engine 108 can determine a portion of the session keys and/or session IDs within a database based on a number of rules from the rules engine 110.

The rules engine 110 can include hardware and/or a combination of hardware and programming, but at least hardware, to determine a number of rules for storing and sharing the number of corresponding session keys and session IDs. The number of rules can include rules for storing the session keys and session IDs for corresponding communication packets (e.g., PCAPs, live traffic, etc.). The rules engine 110 can include a loop storage rule where the PCAPs and/or corresponding session keys and session IDs are stored in a loop configuration. The loop configuration can save a particular quantity corresponding PCAPs and/or session keys and session IDs before storing new PCAPs and/or corresponding session keys and session IDs over PCAP and/or a session key and/or session ID that was saved at an earliest date. For example, the rules engine 110 can save a quantity of 10 PCAPs. When the session key repository reaches 10 PCAPs, the next received PCAP will be saved over the first of the 10 PCAPs stored within the session key repository.

The rules engine 110 can also determine a number of rules that include a type of data (e.g., content type, etc.) to be stored. For example, the communication packets and corresponding session keys and session IDs can include particular content types (e.g., financial data, human resources (HR) data, advertisement data, etc.). In this example, the rules engine 110 can determine whether financial data is relative and whether the session keys and session IDs relating to the financial data should be stored.

The repository engine 112 can include hardware and/or a combination of hardware and programming, but at least hardware, to send a portion of the number of session keys and session IDs to a network tool based on the number of rules and identification of the network tool. The repository engine 112 can store session keys and session IDs based on the rules from the rules engine 110. In some embodiments, the repository engine 112 can store a number of captured packets (PCAPs) of the encrypted communication based on the number of rules. Furthermore, in some embodiments, the repository engine 112 can receive a request for a number of session keys corresponding to live communication from the network tool and send a portion of the requested number of session keys to the network tool based on the number of rules. That is, the repository engine 112 can receive requests from a number of network tools that correspond to communication that was previously sent to the network tool and determine what portions of the communication the network tool can decrypt based on the number of rules. The number of rules can define what content type and/or what portions of the communication can be decrypted for a plurality of different network tools.

FIG. 2 illustrates a diagram of an example computing device 214 consistent with the present disclosure. The computing device 214 can utilize software, hardware, firmware, and/or logic to perform functions described herein.

The computing device 214 can be any combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., identify a number of session keys and session IDs for a packet of encrypted communication, wherein the packet was encrypted with a private key, store the number of session keys and session IDs in a session key repository based on a number of rules, send the packet of encrypted communication to a network tool, receive a request from the network tool for the number of session keys corresponding to the received packet of encrypted communication, provide a portion of the number of session keys and session IDs to the network tool based on an authorization of the network tool and the number of rules, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., monitor module 222, identification module 224, rules module 226, repository module 228) can include CRI that when executed by the processing resource 216 can perform functions. The number of modules (e.g., monitor module 222, identification module 224, rules module 226, repository module 228) can be sub-modules of other modules. For example, the detection module 224 and the rules module 226 can be sub-modules and/or contained within the same computing device. In another example, the number of modules (e.g., monitor module 222, identification module 224, rules module 226, repository module 228) can comprise individual modules at separate and distinct locations (e.g., CRM, etc.).

Each of the number of modules (e.g., monitor module 222, identification module 224, rules module 226, repository module 228) can include instructions that when executed by the processing resource 216 can function as a corresponding engine as described herein. For example, the monitor module 222 can include instructions that when executed by the processing resource 216 can function as the monitor engine 106. In another example, the identification module 224 can include instructions that when executed by the processing resource 216 can function as the identification engine 108. In another example, the rules module 226 can include instructions that when executed by the processing resource 216 can function as the rules engine 110. Furthermore, the repository module 228 can include instructions that when executed by the processing resource 216 can function as the repository engine 112.

Figure 3:
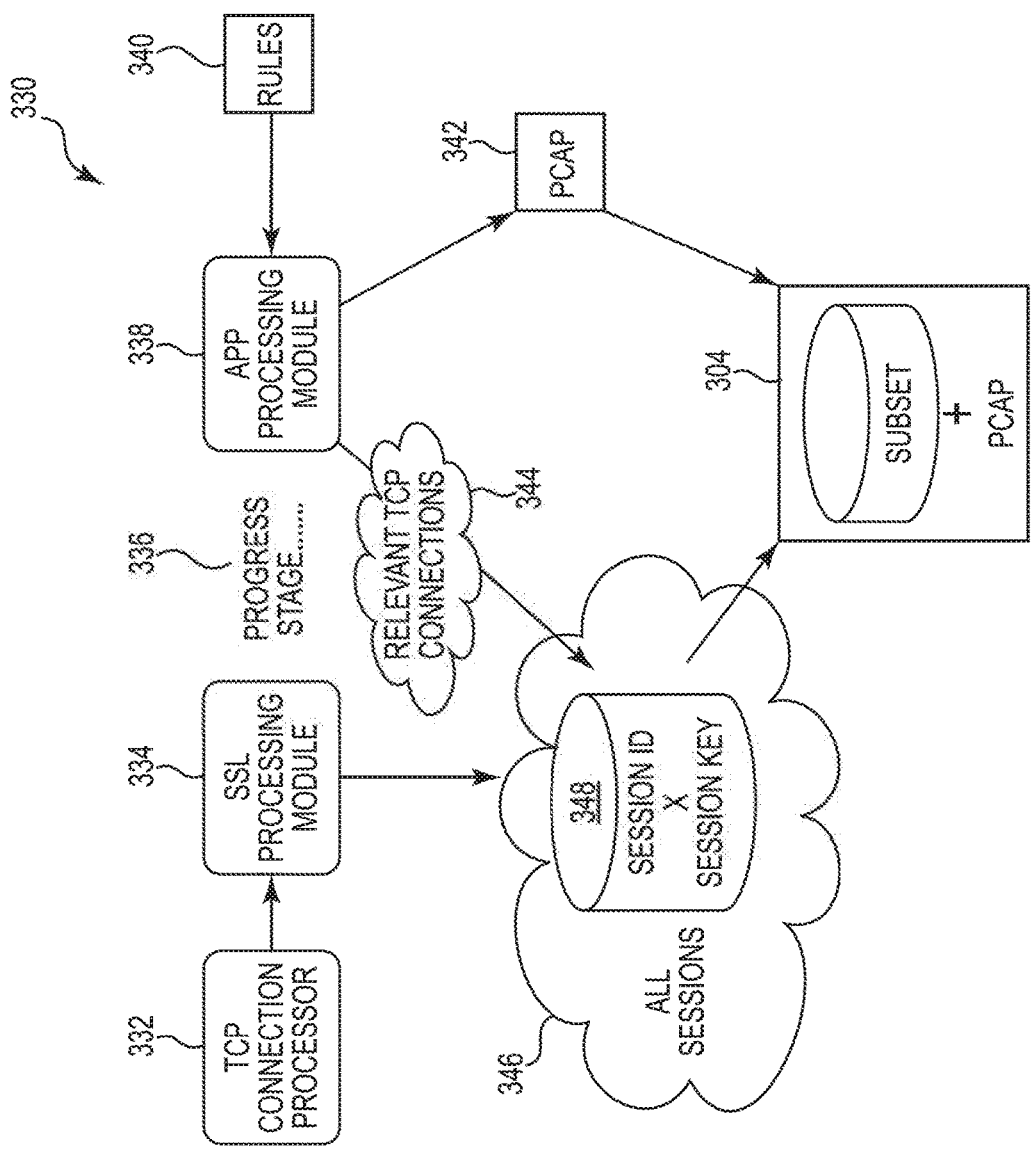
FIG. 3 illustrates a diagram of an example of a system for a session key repository consistent with the present disclosure.

FIG. 3 illustrates a diagram of an example of a system 330 for a session key repository consistent with the present disclosure. The system 330 can include a transmission control protocol (TCP) connection processor 332 to establish communication (e.g., process or parse the communication) between a first application and a second application. The TCP connection processor 332 can establish a communication session (e.g., communication pathway, secure communication session, etc.) between the first application and the second application for sending packets of information. In some embodiments, the TCP connection processor 332 can establish a communication session via an authorization process (e.g., handshake, exchange of information between the first application and the second application, etc.).

The system 330 can include a secure socket layer (SSL) processing module 334. The SSL processing module 334 can be utilized to encrypt/decrypt message packets via a secure communication session between a first application and a second application. The SSL processing module 334 can establish the SSL communication session and encrypt communication packets utilizing a private key and/or private key/public key combination. In some embodiments, the SSL processing module 334 can establish a session key and session ID for the secure communication session between the first application and the second application. The session key and session ID can be utilized for a communication session between the first application and the second application. The system 330 illustrates an SSL processing module 334; however, the SSL processing module 334 could be replaced with a number of different encryption processing modules (e.g., TLS processing module, DH processing module coupled to SSL processing module 334, etc.).

The session key and session ID can be utilized by the first application and the second application to encrypt and/or decrypt the SSL encrypted communication during or after the communication session. The session key and session ID can be sent through a network 346 and stored at a database 348. In some embodiments, all session keys and session IDs corresponding to communication with the first application. The system 330 can include a progress stage 336. The progress stage 336 can include message packets being exchanged between the first application and the second application during the communication session.

The system 330 can include an application processing module 338 to determine a number of relevant TCP connections 344 and/or communication sessions. The number of relevant TCP connections 344 from the database 348 can be based on a number of rules 340. The number of rules 340 can define particular content types and/or subjects of communication between a first application and a second application. That is, the number of rules can be based on content (e.g., subject of the communication, category of information within the communication, department within an organization, TCP range, IP range, table values as a result of a query, table names as an input for a query, etc.) within the encrypted communication. For example, a search can be performed on the communication packets (e.g., search of protocol, search of the header information, search of the body of the communication packet, etc.) to determine a content type for the communication packets. For example, the number of rules can define that human resources (HR) communication is considered relevant communication. In another example, the number of rules can define that financial transactions are not considered relevant communication. In another example, the number rules can be based on: HTTP content, a number of components of an HTML page, data relating to a protocol (e.g., mssql query, etc.), and a number of TCP properties of the packet of encrypted communication.

A number of communication packets (e.g., PCAPs, live traffic communication packets, etc.) 342 from a number of communication sessions can be monitored. In some embodiments, the communication packets 342 can be stored in a database 304 with a corresponding session ID and session key. In other embodiments, only the corresponding session ID and/or session key are stored in the database 304. The number of rules 340 can define the relevant TCP connections 344 from the network 346 that includes all communication session IDs and session keys stored in the database 348. For example, the application processing module 338 can utilize the number of rules 340 to determine a number PCAPs 342 or live communication packets and a number of relevant TCP connections 344. In this example, the application processing module 338 can store a subset of session IDs, session keys, and/or a corresponding PCAP or live traffic in a database 304.

In some embodiments the communication session can be established utilizing a Diffie-Hellman (DH) key exchange for an SSL communication session. In previous systems and methods it would not be possible to decrypt SSL communication sessions established utilizing a DH key exchange by a network tool monitoring the traffic (e.g., RUM). The system 330 can utilize a sniffer on the application to store PCAPs or live traffic with corresponding session keys and session IDs from the communication session established utilizing the DH key exchange. The system 330 can also store only the corresponding session keys and/or session IDs and provide them to the database 304. The stored session keys and/or session IDs can be accessed by network tools (e.g., RUM, etc.) by requesting the session keys and/or session IDs from the database 304.

By storing corresponding session IDs and/or session keys, the private key may not have to be distributed to as many network tools in order to decrypt the communication packets as compared to previous systems and methods. That is, the private key would not have to be distributed to the network tools that are attempting to access the information within the decrypted communication packets 342. In addition, the system 330 can reduce security risks by being a single centralized security point.

The system 330 can provide additional control to application administrators by providing customizable and configurable rules to regulate how session keys are stored in the session key repository as well as what content can be decrypted by authorized network tools. Furthermore, previous methods can make it difficult to provide decrypted communication packets to third parties. For example, the system 330 can be utilized to provide a third party with a way to decrypt communication relating to cases of: troubleshooting, debugging, providing proofs, third party issues, and/or third party providers requesting the decrypted communication. Furthermore, the system 330 ensures that future SSL sessions could not be decrypted since the future SSL sessions do not correspond with the specific session keys and/or session IDs that are provided by the database 304 to the third party. In previous cases of providing only the PCAPs to a third party, there are no options of decrypting the PCAPs without the private key being provided to the third party.

Figure 4:
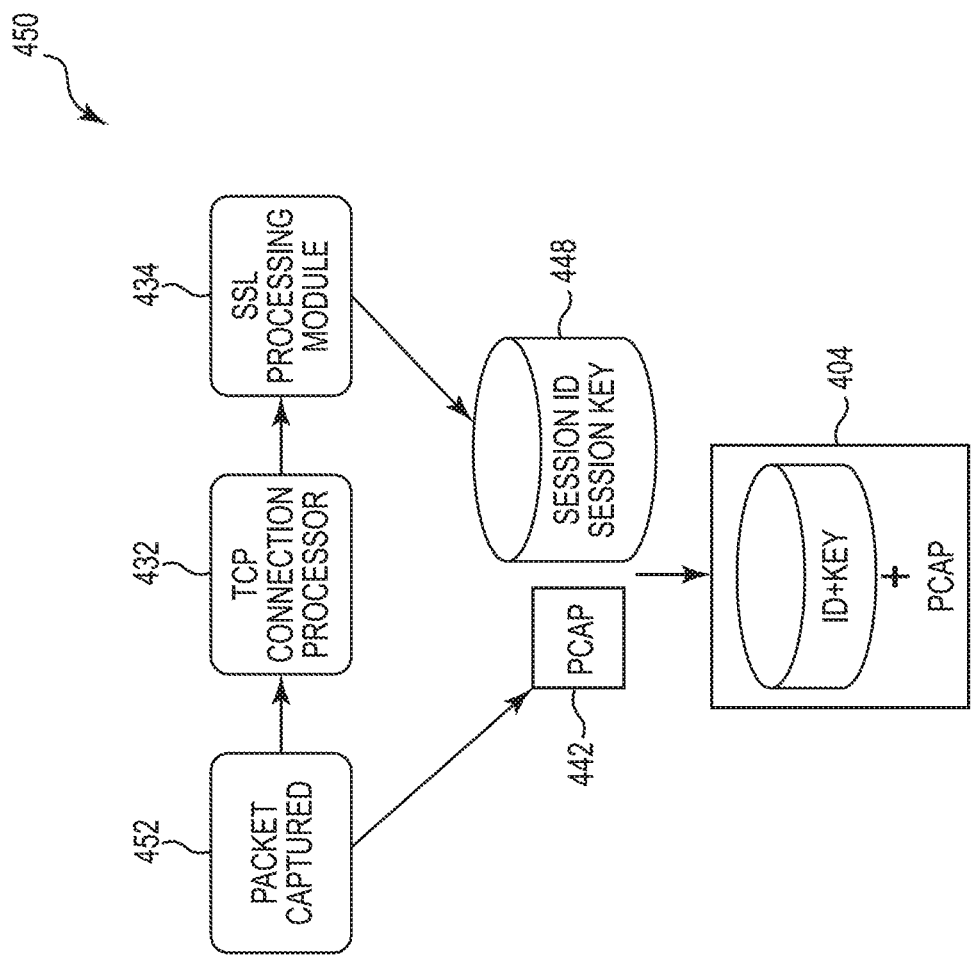
FIG. 4 illustrates a diagram of an example of a system for a session key repository consistent with the present disclosure.

FIG. 4 illustrates a diagram of an example of a system 450 for a session key repository consistent with the present disclosure. The system 450 can provide a database 404 that can include a number of session IDs, session keys, and corresponding captured communication packets (PCAPs) 442 or live communication traffic (e.g., communication traffic captured online, etc.). FIG. 4 illustrates PCAPs 442 but can also include live communication traffic that is captured online. The database 404 can be utilized by a number of network tools to utilize and decrypt the PCAPs 442 without having access to a private key. For example, the database 404 can be accessed by an authorized network tool and utilize a session ID and/or a session key to decrypt a corresponding PCAP 442. In some embodiments, only the session ID and/or session key for the corresponding PCAP are stored in the database 404. In these embodiments, the PCAP 442 and/or live communication traffic can be accessed directly by the number of network tools. Also, traffic can be accessed indirectly. For example, communication traffic can be accessed indirectly by sending the traffic from a server collector (e.g., HP RUM Server Collector) to a third party provider (e.g., SaaS tools such as RUM as SaaS, etc.).

The PCAPs 442 can be captured at 452. The PCAPs 442 can be captured by a number of tools such as: a monitor (e.g., Real User Monitor, a web application firewall (WAF), an intrusion detection system, etc.), a webserver, a router, a switch, a load balancer, a server proxy, a cache server, a network item, a sniffer, and/or a crawler. The PCAPs can include a number of messages and/or data packets that have been encrypted with a particular private key and/or private key/public key combination. The TCP connection processor 432 can parse packets and/or arrange packets to a particular TCP session and explore the next protocol inside the TCP data. For example, the TCP connection processor 432 can identify that the communication packet is associated with HTTP. In this example, the TCP connection processor 432 can move the communication packet to an HTTP parser (Not Shown). In another example, the TCP connection processor 432 can identify that the communication packet is associated with SSL and the TCP connection processor 432 can send the communication packet to the SSL procession module 434.

The system 450 can include an SSL processing module 434. The SSL processing module 434 can provide a private key and/or private key/public key combination when establishing a secure connection session. When the private key and/or private key/public key combination is received and a secure connection session is or was previously established, the SSL processing module 434 can establish a session ID and/or session key for the secure connection session that can be used during the secure connection session. The session ID and/or session key can be utilized to encrypt and decrypt communication during the secure connection session. The SSL processing module 434 can collect and store the session IDs and session keys in a database 448. In some embodiments, the session IDs and session keys are collected and stored in database 448 based on a number of rules. As described herein, the number of rules can define particular communication and/or particular secure communication session that are deemed relevant to collect. For example, the number of rules can define financial communication to be relevant and define human resources communication to be non-relevant or secure communication. In some embodiments, the number of rules can include a particular duration of time. For example, a number of rules can be applied for a particular time period and change to a different number of rules after the particular time period. That is, each time period can have a specific number of rules that are utilized during each corresponding time period.

The corresponding session IDs and session keys stored in database 448 can be combined into a database 404. The session IDs and/or session keys stored in database 448 can be combined into the database 404 in corresponding pairs based on the number of rules. That is, communication PCAPs 442 that were communicated during a communication session that utilized a particular session ID and/or session key can be stored as a pair in database 404.

In some embodiments, the corresponding session ID and/or session key stored in the database 404 can be accessed by authorized network tools. The authorized network tools can include real user monitors (RUM) and/or intrusion detection systems, among other network tools as described herein. The authorized network tools can access the database 404 to retrieve the corresponding session ID and/or session key to decrypt the PCAP 442 without needing access to the private key that established the secure communication session.

By storing a corresponding session ID and/or session key, the private key may not have to be distributed to as many network tools as compared to previous systems and methods. That is, the private key would not have to be distributed to the network tools that are attempting to access the information within the decrypted PCAPs 442 or live traffic.

Figure 5:
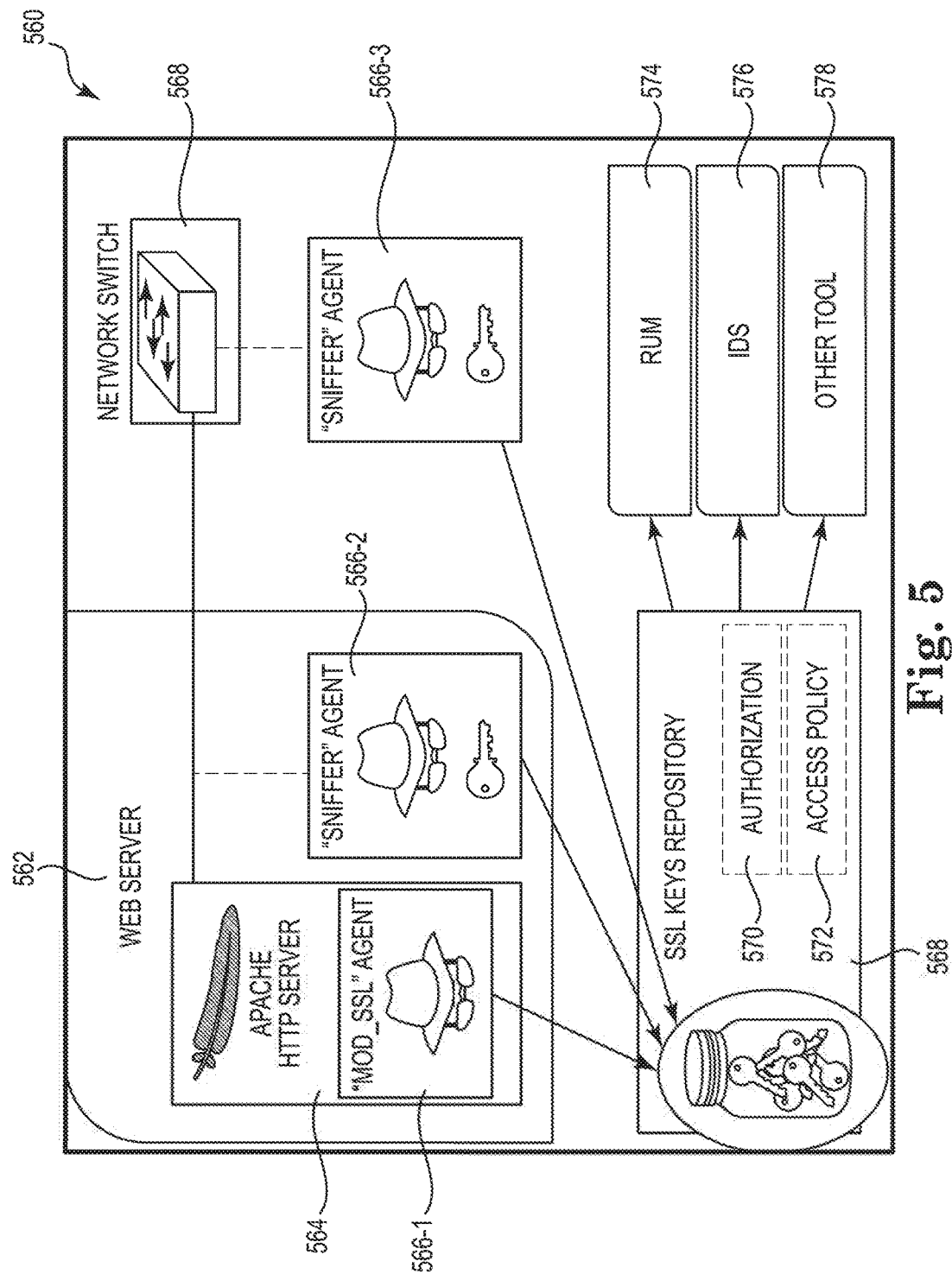
FIG. 5 illustrates a diagram of an example of a system for a session key repository consistent with the present disclosure.

FIG. 5 illustrates a diagram of an example of a system 560 for a session key repository consistent with the present disclosure. The system 560 can include a web server 562. The web server 562 can include a computing device as described herein.

The number of services can include executing an application 564 to provide a service. The application 564 can communicate with a number of other applications and/or computing devices during execution. In some embodiments, the web server 562 can be coupled to a network switch 568 that couples the web server 562 to a network (e.g., local area network (LAN), wide area network (WAN), etc.). In some embodiments, the application 564 can utilize the network switch 568 to communicate with other applications and/or computing devices.

The application 564 can utilize secure communication sessions as described herein. The secure communication sessions can be established utilizing a private key and/or a private key/public key combination. When a secure communication session is established with the application 564 and a different application or computing device, a session ID and/or session key can be issued for encrypting packets of communication during the secure communication session.

The system 560 can include one or more agents 566-1, 566-2, 566-3. The one or more agents 566-1, 566-2, 566-3 can include real user monitors (RUM)s, application monitors, sniffer agents, among other network tools configured to monitor network communication. In some embodiments, the one or more agents 566-1, 566-2, 566-3 can monitor and/or store communication packets (e.g., PCAPs, live communication packets, etc.) being sent from the application 564 and received at the application 564. In some embodiments, the communication packets can be stored in an SSL key repository 568 with a corresponding session ID and/or session key. In some embodiments, only the corresponding session ID and/or session key are stored in the SSL key repository 568. In some embodiments, the corresponding session ID and/or session key are not stored, but only sent and/or passed to a network agent to provide the session key and/or session ID to a network device or network tool.

In addition to monitoring and/or storing communication packets in the SSL key repository 568, the one or more agents 566-1, 566-2, 566-3 can monitor and/or store session IDs and/or session keys from the secure communication sessions that correspond to the communication packets. That is, when the one or more agents 566-1, 566-2, 566-3 monitor a session ID and/or session key from a secure communication session, the one or more agents 566-1, 566-2, 566-3 can store the session ID and/or session key with communication packets from the secure communication session.

The one or more agents 566-1, 566-2, 566-3 can be located at a number of different positions within the system 560. For example, the one or more agents 566-1, 566-2, 566-3 can be part of the application 564 (e.g., mod_ssl agent 566-1). In another example, the one or more agents 566-1, 566-2, 566-3 can be incorporated within the web server 562 (e.g., sniffer agent 566-2). Furthermore, the one or more agents 566-1, 566-2, 566-3 can be coupled to a network switch 568 (e.g., sniffer agent 566-3). In some embodiments, the one or more agents 566-1, 566-2, 566-3 can each provide a portion of the information stored in the SSL key repository 568. For example, the agent 566-1 can monitor and store session keys that are issued by the application 564. In this example, the agent 566-2 can monitor and/or store communication packets being received by the application 564 and/or communication packets being sent from the application 564. Furthermore, in this example, the agent 566-3 can monitor and store session IDs issued to an application and/or computing device for the secure communication session with the application 564.

In some embodiments, the SSL key repository 568 can include an authorization module 570 and/or an access policy module 572. The authorization module 570 can be utilized to authorize a number of network tools. The number of network tools can include real user monitors (RUM)s 574, intrusion detection systems 576 web application firewall (WAF), server proxy, cache server, network item, router, switch, application that can process encrypted protocols, and/or other network tools 578 that can utilize decrypted information from particular communication sessions. The authorization module 570 can utilize a number of different authorization methods to confirm the identity of the number of network tools and/or to confirm that the number of network tools are authorized to receive the information from the SSL key repository 568.

The authorization module 570 can utilize the access policy module 572 to determine which of the number of network tools are authorized to access the SSL key repository 568. The access policy module 572 can be utilized to determine a number of access policies that correspond to the stored communication packets and corresponding session IDs and/or session keys. The access policy module 572 can be based on legal distribution of the stored PCAPs and corresponding session IDs and/or session keys. For example, the PCAPs can include medical information and there may be legal consequences for distributing the PCAPs to unauthorized network tools and/or unauthorized users.

In some embodiments, the web server 562 can be utilized by an entity (e.g., bank, financial institution, etc.). For example, a bank can utilize the web server 562 with a WAF that can apply rules to a number of communication sessions. In some embodiments, the WAF can access all communication between the bank and other applications or computing devices (e.g., customers of the bank, etc.). In some embodiments, the WAF can also access session keys and/or session IDs corresponding to encrypted communication packets (e.g., PCAPs and/or live communication). For example, the WAF can request access to encrypted communication and receive the session keys and/or private keys to perform a number of functions. The session keys and/or session IDs for the communication can be stored based on a number of rules set up by an IT administrator of the bank operating the web server 562. The IT administrator can define the number of rules based on content of communication packets as described herein.

In some embodiments the communication between the bank web server 562 and the other applications can be sent to the third party agent. In some embodiments, the third party agent can send the received communication to a third party organization. In some embodiments, the third party organization can request the session keys and/or session IDs for the received communication from the third party agent. For example, the third party organization can communicate with the SSL key repository to request the session keys for the received communication. In some embodiments, the SSL key repository 568 can utilize a web interface to enable the third party organization to request session keys corresponding to the received communication. In another example, the third party organization can utilize the web interface to provide access credentials to the SSL key repository 568. In this example, the SSL key repository 568 can utilize the access policy 572 to perform an authorization of the third party organization based on the provided access credentials.

In some embodiments, the third party agent can identify that a portion of the communication is encrypted and request session keys and/or session IDs from the SSL key repository 568. In this embodiment, the SSL key repository 568 can determine what session keys and/or session IDs that the third party agent can utilize and send the third party agent the session keys and/or session IDs based on the number of rules determined by the IT administrator.

In some embodiments, a third party agent that is not associated with the bank web server 562 may want to view a portion of the communication (e.g., specific parts of communication packets, communication packets with a particular content type, etc.) between the bank and other applications or computing devices. In these embodiments, the third party agent may not be associated with the web server 562 or the other applications or computing devices communicating with the web server 562. The SSL key repository 568 can enable the third party agent to access encrypted communication between the bank and the other applications based on the number of rules determined by the IT administrator.

The number of rules determined by the IT administrator can allow a third party agent to access stored PCAPs with corresponding session keys and/or session IDs that correspond to a content type that is defined by the number of rules. For example, the number of rules can define the content type of the encrypted communication that is accessible by the third party agent to be advertisement communication. That is, only advertisement communication between the bank and the other applications can be accessed by the third party agent through the SSL key repository 568. The number of rules can also include a number of additional rules that can outline content type communication that is acceptable to store PCAPs with corresponding session keys and/or session IDs that can be accessed by the third party agent.

In some embodiments, the third party agent can utilize a SaaS (e.g., RUM SaaS) that can provide monitoring services for the bank web server 562. The third party agent utilizing the SaaS may not have direct access to PCAPs and/or live communication from the web server 562 communication of the bank. In some embodiments, the PCAPs and/or live communication can be sent to the third party agent from the session key repository 568. For example, the third party agent can receive PCAPs and/or live communication with a particular content type. In some embodiments, the third party agent can send a number of PCAPs and/or live communication to the RUM SaaS. In these embodiments, the third party agent may determine that the PCAPs and/or live traffic were encrypted and send a request to the SSL key repository 568 for the corresponding session keys and/or session IDs. The SSL key repository 568 can determine what portions of the PCAPs and/or live communication the third party agent or third party organization is authorized to decrypt and send session keys and/or session IDs to the third party agent or third party organization based on the number of rules defined by the IT administrator of the bank. The third party agent and/or third party organization can utilize the session keys and/or session IDs from the SSL key repository 568 to decrypt portions of the PCAPs and/or live communication received from the bank web server 562.

By storing a corresponding session ID and/or session key, the private key may not have to be distributed to as many network tools as compared to previous systems and methods. That is, the private key would not have to be distributed to the network tools that are attempting to access the information within the decrypted communication packets. In addition, the system 560 can reduce security risks by generating a single centralized security point.

The system 560 can provide additional control to application administrators by providing customizable and configurable rules to regulate how session keys are stored in the session key repository as well as what content can be decrypted by authorized network tools. Furthermore, previous methods can make it difficult to provide decrypted communication packets to third parties. For example, the system 330 can be utilized to provide a third party with decrypted communication relating to cases of: troubleshooting, debugging, providing proofs, third party issues, and/or third party providers requesting the decrypted communication. Furthermore, the system 560 can ensure that future SSL sessions are not decrypted since the future SSL sessions do not correspond with the specific session keys and/or session IDs that are provided by the database to the third party. In previous cases of providing only the PCAPs to a third party, there are no options of decrypting the PCAPs without the private key being provided to the third party.

Figure 6:
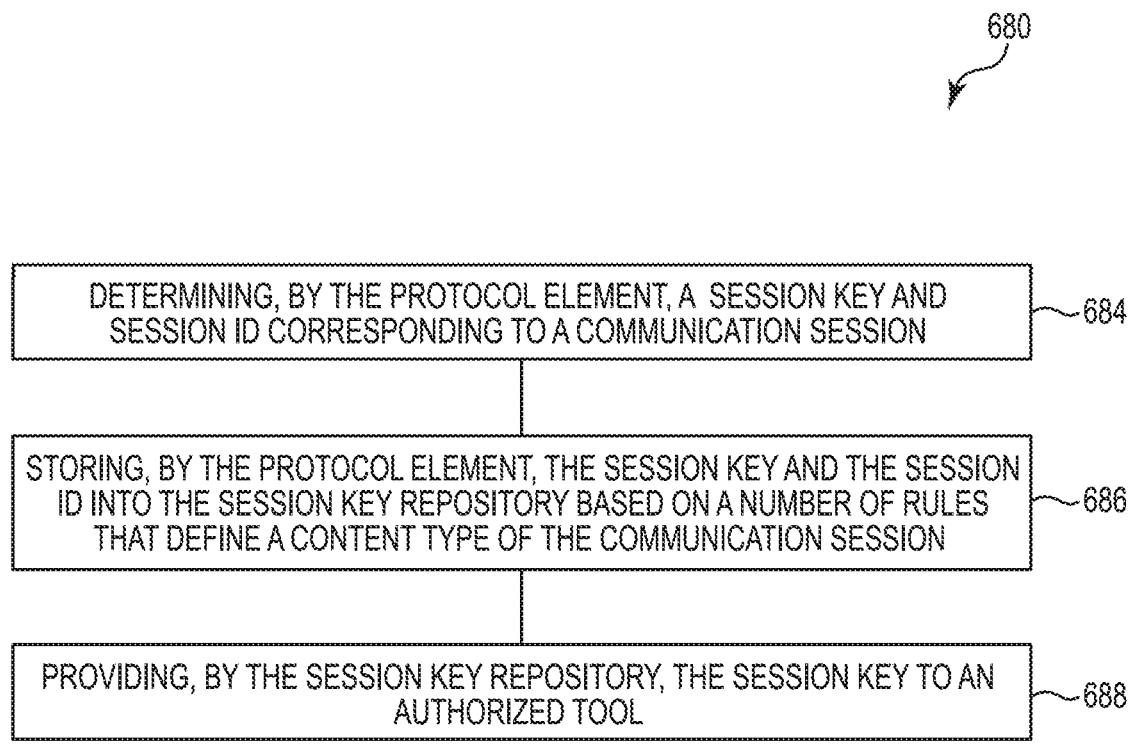
FIG. 6 is a flow chart of an example of a method for providing a session key repository consistent with the present disclosure.

FIG. 6 is a flow chart of an example of a method 680 for providing a session key repository consistent with the present disclosure. The method 680 can be executed by a computing device as described herein. The method 680 can provide for greater security of a computing system. For example, the method 680 can provide PCAPs that can be decrypted by network tools without distributing a private key to the network tools. Limiting distribution of the private key can increase the security of the computing system.

At box 684, the method 680 can include determining, by the protocol element, a session key and session ID corresponding to a communication session. In some embodiments, the communication session is established utilizing a private key. Determining the session key and session ID corresponding to the PCAP file can include searching a database of stored session keys and session IDs that correspond to all communication between a number of applications and/or computing devices to determine a number of session keys and session IDs that correspond to the PCAP files. In some embodiments, the session key, session ID, and corresponding PCAP file can be stored together as a pair. The pair can be distributed to other network devices, as described herein, to enable the network devices to decrypt the communication packets with the session key and/or session ID.

At box 686, the method 680 can include storing, by the protocol element, the session key and the session ID into the session key repository based on a number of rules that define a content type of the communication session. As described herein the session key repository can be a database that includes an authorization module and/or an access policy module to control access to the database for a number of network tools. As described herein, in some embodiments, only the PCAP files, session keys, and session IDs that are allowed by the number of rules are stored in the session key repository.

At box 688, the method 680 can include providing, by the session key repository the session key to an authorized tool. Providing the decrypted communication packets can include providing the encrypted communication packets with a corresponding session ID and/or session key so that a network tool can decrypt the communication packets utilizing the session ID and/or session key. As described herein, an authorized tool can be an authorized network tool that is authorized to utilize and/or distribute the decrypted information of the communication packets.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system for a session key repository, comprising: a processing resource; and a non-transitory computer-readable memory resource on which is stored computer-readable instructions that when executed by the processing resource, cause the processing resource to:

monitor communication between a first computing device and a second computing device, the communication being encrypted with a private key;

determine a number of session keys and session IDs that correspond to the encrypted communication;

determine a number of rules for storing and sharing the number of corresponding session keys and session IDs, the rules being based on content within the encrypted communication;

identify a network tool that is to decrypt at least a portion of the encrypted communication; and send a portion of the number of session keys and session IDs to the identified network tool based on the number of rules.

2. The system of claim 1, wherein the computer-readable instructions are further to cause the processing resource to store a number of captured communication packets (PCAPs) of the encrypted communication based on the number of rules.

3. The system of claim 1, wherein the computer-readable instructions are further to cause the processing resource to decrypt portions of the encrypted communication with the number of corresponding stored session keys and session IDs.

4. The system of claim 1, wherein the computer-readable instructions are further to cause the processing resource to send live communication to the identified network tool, wherein the live communication is encrypted by the private key.

5. The system of claim 4, wherein the computer-readable instructions are further to cause the processing resource to receive a request for a number of session keys corresponding to the live communication from the network tool and to send a portion of the requested number of session keys to the network tool based on the number of rules.

6. The system of claim 1, wherein the computer-readable instructions are further to cause the processing resource to define a content type of the encrypted communication to store and share the number of session keys and session IDs to be stored by the processing resource.

7. The system of claim 1, wherein the computer-readable instructions are further to cause the processing resource to determine when the network tool is authorized to access the portion of the number of session keys and session IDs based on the number of rules.

8. The system of claim 1, wherein the computer-readable instructions are further to cause the processing resource to send the portion of the number of session keys and session IDs to the identified network tool without sending the private key to the identified network tool.

9. A non-transitory computer readable medium storing instructions executable by a processing resource that, when executed by the processing resource, cause the processing resource to:
identify a number of session keys and session IDs for a packet of encrypted communication between a first computing device and a second computing device, the packet being encrypted with a private key;
store the number of session keys and session IDs in a session key repository based on a number of rules, the rules being based on content within the encrypted communication:
identify a network tool that is to decrypt at least a portion of the encrypted communication;
send the packet of encrypted communication to the identified network tool; receive a request from the identified network tool for the number of session keys corresponding to the sent packet of encrypted communication; and provide a portion of the number of session keys and session IDs to the identified network tool based on an authorization of the identified network tool and the number of rules.

10. The medium of claim 9, wherein the instructions to identify the number of session keys and session IDs include instructions to utilize the private key to identify the session key and the session ID.

11. The medium of claim 9, wherein the number of rules define a content type of communication for storing the number of session keys and session IDs.

12. The medium of claim 11, wherein the number of rules are based on at least one of: HTTP content, a number of components of an HTML page, a subject of the encrypted communication, a category of the encrypted communication, a department associated with the encrypted communication, an IP range, a table name as a result of a query, a table value as a result of a query, and a number of TCP properties the encrypted communication.

13. The medium of claim 9, wherein the instructions, when executed, cause the processing resource to provide the portion of the number of session keys and session IDs to the identified network tool without sending the private key to the identified network tool.

14. A method for providing a session key repository, comprising:
determining, by a protocol element, a session key and a session ID corresponding to a communication session between a first computing device and a second computing device, the communication session being established with a private key;
storing, by the protocol element, the session key and the session ID into the session key repository based on a number of rules, wherein the rules are based on content within the communication session and define a content type of the communication session;
identifying, by the protocol element, a network tool that is to decrypt at least a portion of an encrypted communication; and
providing, by the protocol element, the session key to the identified network tool based on an authorization of the identified network tool and the number of rules.

15. The method of claim 14, comprising decrypting, by the identified network tool, communication of the communication session utilizing the session key and the session ID.

16. The method of claim 15, wherein the private key associated with the communication session is an unknown private key for the identified network tool.

17. The method of claim 15, wherein decrypting communication of the communication session includes decrypting a portion of the communication session that corresponds to the provided session key.

18. The method of claim 14, wherein providing the session key further comprises sending the session key to the identified network tool without sending the private key to the identified network tool.

* * * * *